US012239249B2

(12) United States Patent
Steer

(10) Patent No.: US 12,239,249 B2
(45) Date of Patent: Mar. 4, 2025

(54) GRAPHICS DISPLAY APPARATUS

(71) Applicant: Gavin Milton Steer, George (ZA)

(72) Inventor: Gavin Milton Steer, George (ZA)

( * ) Notice: Subject to any disclaimer, the term of this patent is extended or adjusted under 35 U.S.C. 154(b) by 40 days.

(21) Appl. No.: 17/784,875

(22) PCT Filed: Dec. 14, 2020

(86) PCT No.: PCT/IB2020/061911

§ 371 (c)(1),
(2) Date: Jun. 13, 2022

(87) PCT Pub. No.: WO2021/117020

PCT Pub. Date: Jun. 17, 2021

(65) Prior Publication Data

US 2023/0010096 A1 Jan. 12, 2023

(30) Foreign Application Priority Data

Dec. 13, 2019 (ZA) ................................ 2019/08334

(51) Int. Cl.
*A47G 1/06* (2006.01)
*G09F 15/00* (2006.01)

(52) U.S. Cl.
CPC ......... *A47G 1/065* (2013.01); *G09F 15/0012* (2013.01)

(58) Field of Classification Search
CPC .. A47G 1/065; A47G 1/0605; G09F 15/0012; G09F 15/0006; A47F 7/14
USPC .................................................... 248/66, 917
See application file for complete search history.

(56) References Cited

U.S. PATENT DOCUMENTS 4,123,862 A * 11/1978 Dyer .................... A47G 1/0616 40/760
4,912,863 A 4/1990 Harvey
5,189,820 A * 3/1993 Komamura .......... A47G 1/0611 16/355
5,687,970 A * 11/1997 Clark .................. A63F 3/00634 273/281
5,725,213 A * 3/1998 Kuczynski ............ A63F 9/0807 273/153 S
6,039,318 A * 3/2000 Kuczynski ............ A63F 9/0807 273/153 S
6,979,245 B1 * 12/2005 Goodwin .................. A63F 9/10 446/175
7,373,747 B1 * 5/2008 Wiemer .................... G09F 7/00 40/605

(Continued)

FOREIGN PATENT DOCUMENTS

WO 2003000097 A1 1/2003

*Primary Examiner* — Muhammad Ijaz
(74) *Attorney, Agent, or Firm* — Muncy, Geissler, Olds & Lowe, P.C.

(57) ABSTRACT

The enlargement of photographs for mounting in a graphics display apparatus including a plurality of rectangular modular supports, a plurality of planar covers each releasably engageable over a front side of a support, and a plurality of connectors for releasably connecting adjacent supports. A customer supplies the photograph to a vendor and specifies a required size for printing of the photograph. The vendor prints the photograph as rectangular portions corresponding to a support of the graphics display apparatus. The vendor provides to the customer the supports, the portions of the photographs and/or covers, and the connectors for assembly by the customer of the display apparatus.

20 Claims, 8 Drawing Sheets

(56) References Cited

U.S. PATENT DOCUMENTS

| | | | | |
|---|---|---|---|---|
| 7,584,562 | B2 * | 9/2009 | Youn | G09F 9/3026 40/605 |
| 10,672,306 | B1 * | 6/2020 | Whidden | G09F 15/0068 |
| 11,359,382 | B2 * | 6/2022 | Meersman | E04F 13/0871 |
| 11,974,680 | B1 * | 5/2024 | Davis | A47G 1/065 |
| 2003/0056413 | A1 * | 3/2003 | Wiemer | G09F 9/3026 40/605 |
| 2006/0107571 | A1 * | 5/2006 | Steer | G09F 15/0025 40/606.12 |
| 2008/0047184 | A1 * | 2/2008 | Dean | G09F 15/0012 40/624 |
| 2009/0317599 | A1 * | 12/2009 | Heuman | A47G 1/065 428/189 |
| 2010/0159160 | A1 * | 6/2010 | Basile | G09F 15/0006 428/44 |
| 2016/0345754 | A1 * | 12/2016 | Hogrefe | A47G 1/065 |
| 2019/0290028 | A1 | 9/2019 | Hatton et al. | |
| 2020/0058238 | A1 * | 2/2020 | Davis | G09F 11/025 |
| 2023/0010096 | A1 * | 1/2023 | Steer | A47G 1/0605 |
| 2023/0148768 | A1 * | 5/2023 | Paulin | A47G 1/065 40/729 |
| 2024/0156282 | A1 * | 5/2024 | Walsh | A47G 1/205 |

* cited by examiner

GRAPHICS DISPLAY APPARATUS

FIELD OF THE INVENTION

The invention relates to display apparatus assembled from modular supports (and other customized components) that collectively provide a display for a graphic that is larger and commonly much larger than one of the separate modular supports.

BACKGROUND TO THE INVENTION

Various configurations of display apparatus have been proposed for different applications. The support of a large-scale graphic print, poster or other images can produce a desirable result in a commercial environment for marketing and advertising that is aesthetically pleasing. Such support apparatus may also be used in a home or office environment, for aesthetics, decorative and/or signage purposes.

We live in a digital age where mobile telephone or device cameras and high-resolution professional photographic equipment have become extremely popular as a means to capture and instantly view images at a resolution and clarity previously difficult to achieve and process. While one has the ability to view the results of one's photographic skills on a camera or mobile telephone screen, due to logistical challenges (and many other shortcomings of existing solutions), there are few mechanisms or methods available to depict the images in an edge to edge format, should one want to print enlarged or combined versions of these images. Using existing options such prints become cumbersome or difficult to order, package and transport in a cost effective manner where they won't get damaged.

Using on-line print hubs or facilities and services, franchise outlets and the like, current popular methods for one-off prints would include ink jet or laser prints on a variety of substrates like: canvas, vinyl, self-adhesive vinyl, PVC coated nylon vinyl, paper, cardboard or a poly-art substrate generally supplied in a roll format. Once printed, these alternatives are generally then placed into a rigid frame structure, cut and assembled to suit the respective image dimensions. For large format prints, custom framework has to be erected on site that then requires additional infrastructure and skilled personnel to assemble the rolled print into the frame at great expense. There are also flatbed printers that will print onto hard substrates like wood/fiber board, plastic/aluminum sheets, corrugated cardboard and many other substrates that have a thick cross-section and that cannot be fed off a roll. These options are limited to the sizes of the respective flatbed printers available and if sectioned up into a montage, become bulky and heavy and very difficult to erect.

There is a need in domestic and commercial spaces to be able to print and display a much-enlarged version of a high resolution, digital photograph.

OBJECT OF THE INVENTION

It is an object of the invention to provide display apparatus having components with a unique construction and/or that effectively allows the display of small, large or massive format pictures or other graphic information and content, such as that required for branding and price communication, for example.

SUMMARY OF THE INVENTION

In accordance with the invention there is provided a graphics display apparatus comprising:

(a) a plurality of rectangular modular supports;

(b) a plurality of planar covers each (respectively) releasably engagable over a front side of a support; and (c) a plurality of connectors for releasably connecting adjacent supports; the supports securable to each other by fitting a connector into corresponding socket formations of adjacent supports;

the connectors engageable inside the sockets through resiliently deformable locking formations;

at least one opening through the supports located at each socket of a support to afford access for manual release of the deformable locking formations to disengage a connector from a socket.

The supports, covers and connectors are moulded from plastics material [and the supports and connectors are preferably made from opaque and/or pigmented plastics material]. The supports are preferably rectangles with one pair of longer sides and one pair of shorter side but may alternatively be square rectangles.

A further feature of the invention provides for the supports to include a rectangular frame for edge-to-edge engagement with a frame of an adjacent support and for the sockets to be spaced apart along the frames.

A further feature of the invention provides for a network of elements to extend between four members of the rectangular frame of a support.

The invention further provides for the planar covers to:

i. be transparent for location over a sheet material depicting a graphic, which sheet of material is located against a support;

ii. receive on an outer surface thereof an adhesive sheet depicting a graphic [in which the cover may be black or opaque plastics material]; and/or iii. carry an image printed directly thereon [in which case the cover may be white plastics material].

A further feature of the invention provides for the supports to have sockets that include a pair of opposed, spaced apart shoulders and for the deformable formations to be provided on the clips as a pair of prongs with outwardly disposed barbs to engage past the shoulders.

Further features of the invention provide for apparatus as defined in which: the sockets are each provided by a pair of spaced apart side flanges extending rearwardly from the frame; the sockets are each provided by a pair of spaced apart side flanges are connected by a web extending substantially parallel to the frame; the side flanges are connected to a socket element extending to form part of the network of elements with a pair of inner flanges connecting the web to the socket element and defining with the socket element a slot to receive an elongate guide located between the two prongs of a connector.

A further feature of the invention provides for the supports and end flanges of the covers include resilient clip formations with lips that locate with an interference fit into slots.

Further features of the invention provide for the apparatus to include surface mounting bracket comprising a base and a fastener that is securable to the base and locatable in a hanging formation provided in the network of elements on the support; and for the hanging formation to be located substantially centrally between the members of the frame.

The invention further provides for apparatus as defined: having an outer frame assembly that includes rails, corner pieces, and rail joints with connector components securable into sockets about a periphery of an assembled apparatus and co-operating engaging formations provided between the connector components and the rails; in which the rails are provided with a mounting groove and a coupling channel, the mounting groove engageable with corresponding mounting formations on the connector components and the coupling channel engageable with spigots on the corner pieces and rail joints; in which the mounting groove has a rounded profile formed under a resiliently deformable curved flange and the coupling channel is provided with a pair of opposed lips and provides a friction fit onto rectangular profile spigots of the corner pieces and rail joints; and in which the corner pieces and rail joints respectively include corner spacers and border spacers that fit flush with a profile of the rails when assembled.

The invention still further provides for apparatus as defined in which edges of the supports have abutting ridge formations which maintain spaces between adjacent supports and end flanges of the covers fit into the spaces.

In accordance with a second aspect of the invention there is provided a method for providing an enlarged photograph for display wherein:

- a customer supplies a photograph to a vendor;
- the customer specifies a required size for printing of the photograph selected from a range of sizes for a display apparatus;
- the vendor prints the photograph as rectangular portions corresponding to a support of the graphics display apparatus as defined above; and
- the vendor provides to the customer the supports, the portions of the photographs and/or covers, and the connectors for assembly by the customer of the display apparatus.

A further feature of the invention provides for the portions of the photograph to be printed to omit a border corresponding substantially to a space between graphics on a first support and graphics on an adjacent second support.

A further feature of the invention provides for the portions of the photograph to each carry a mark corresponding to its position in a row and/or column of the photograph.

A further feature of the invention provides for the customer to submit the photograph through an online, Internet based facility and for the display apparatus to be delivered to the customer.

In accordance with a third aspect of the invention there is provided a graphics display apparatus comprising:

- (a) a plurality of rectangular modular supports including planar panels; and (b) a plurality of connectors for releasably connecting adjacent supports; the supports securable to each other by fitting a connector into corresponding socket formations of adjacent supports;
- the connectors engageable inside the sockets through resiliently deformable locking formations;
- with a plurality of the panels provided to feed a printing machine, which prints a series of graphics onto the panels in portions to be combined for a complete graphic on assembly of the supports.

The invention further provides for the panels to be covers that are releasably securable onto the supports; or, alternatively, for the panels to be integral with the supports.

A further feature of the invention provides for the panels to be provided as a cassette comprising a plurality of panels, for the cassette to be loaded into a feed mechanism of the printer.

The three aspects of the invention may be combined or expanded on as the products that are anticipated thereby are refined and commercialized. The invention will also extend to further methods and systems that may be employed for implementation and specific applications of the products.

BRIEF DESCRIPTION OF THE DRAWINGS

These and other features of the invention will become more apparent from the following description, made by way of example only, with reference to the accompanying drawings, in which.

DETAILED DESCRIPTION OF THE INVENTION

Figure 1:
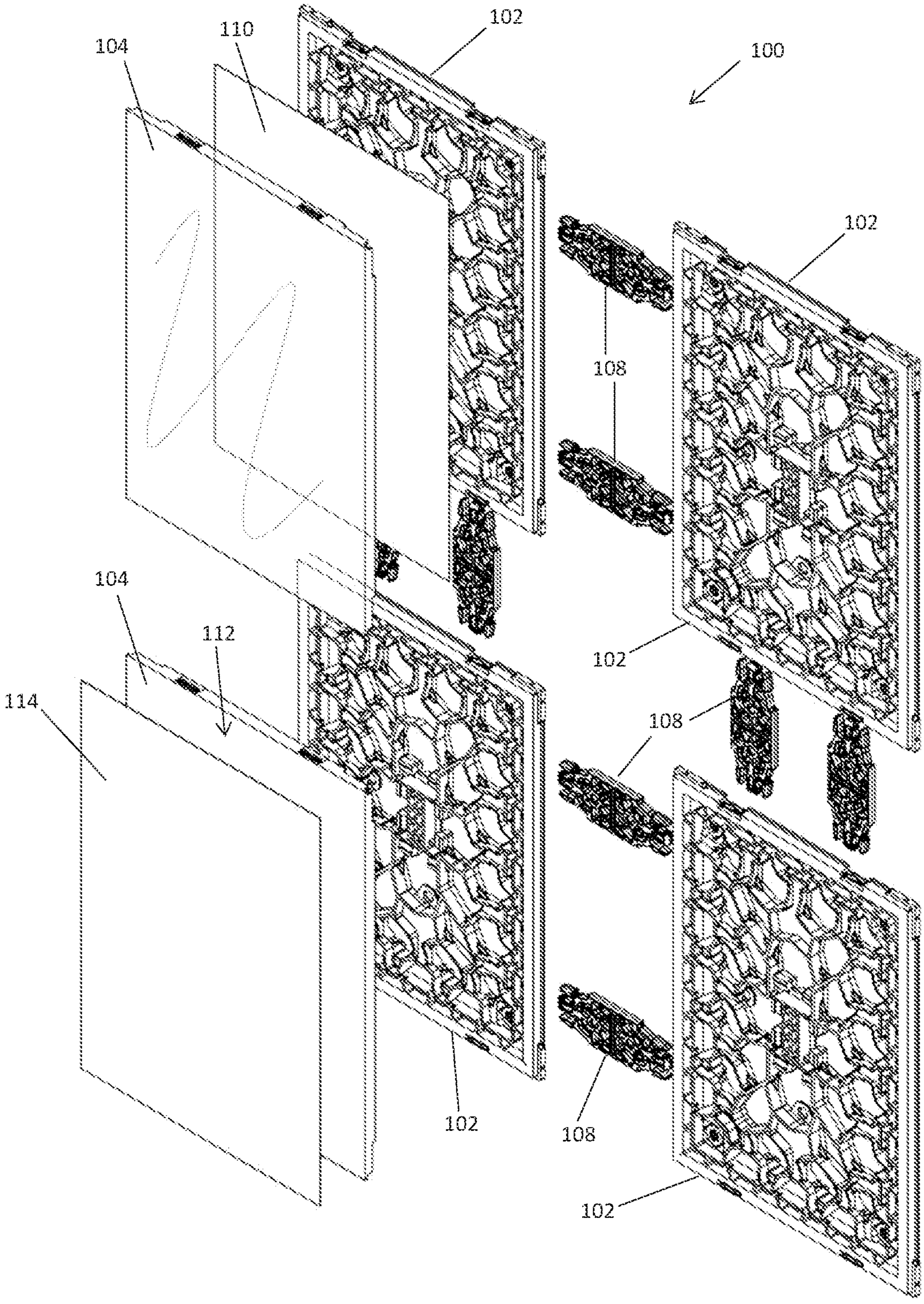
FIG. 1 shows an exploded view of display apparatus in accordance with the invention with a transparent (graphic overlying) cover to the top of the drawing and an opaque (graphic underlying) cover to the bottom of the drawing.
Figure 2:
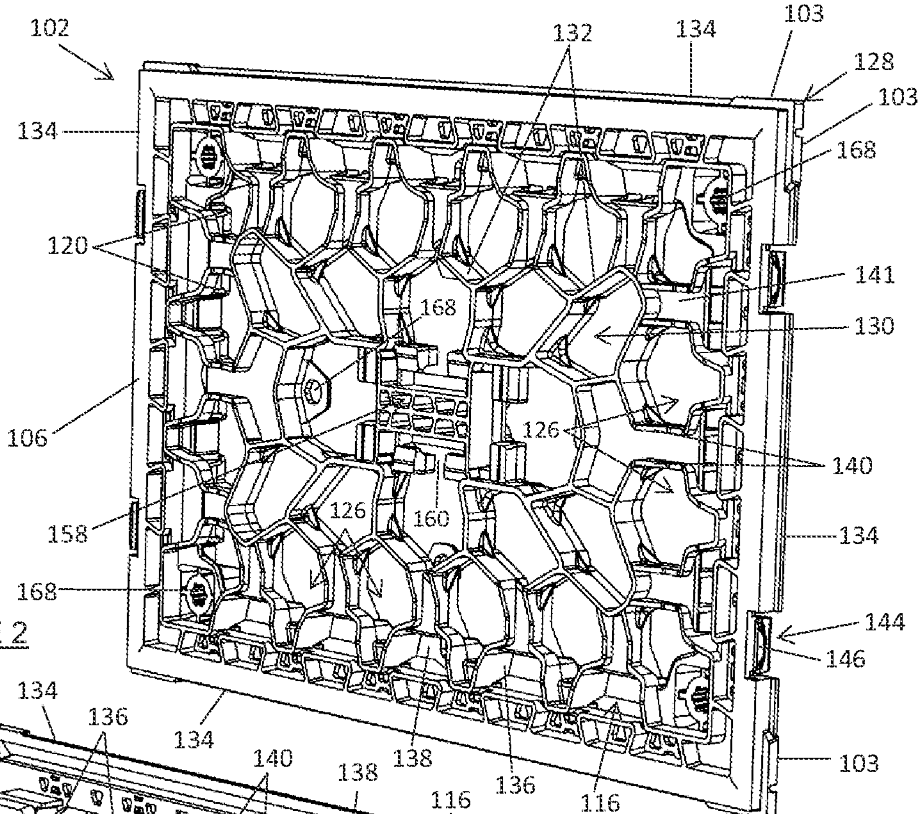
FIG. 2 shows a front perspective view of a modular support.
Figure 3:
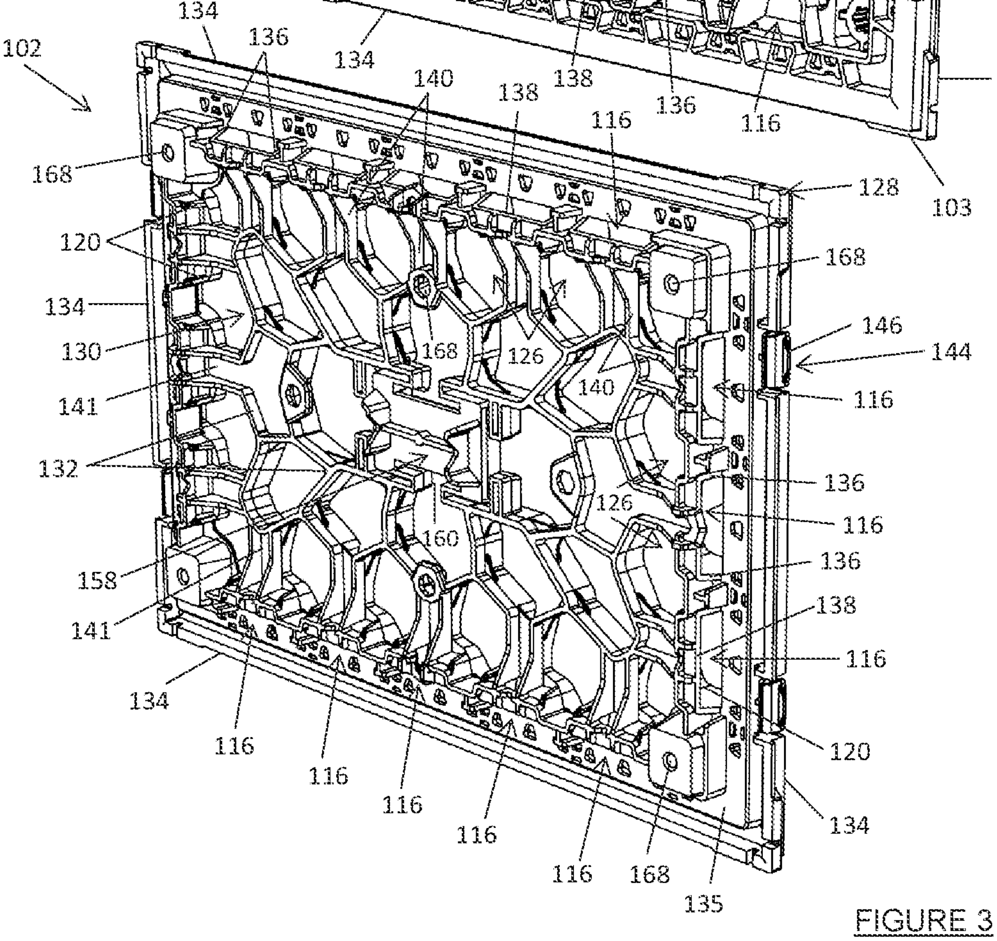
FIG. 3 shows a rear perspective view of the support in FIG. 2.
Figure 4:
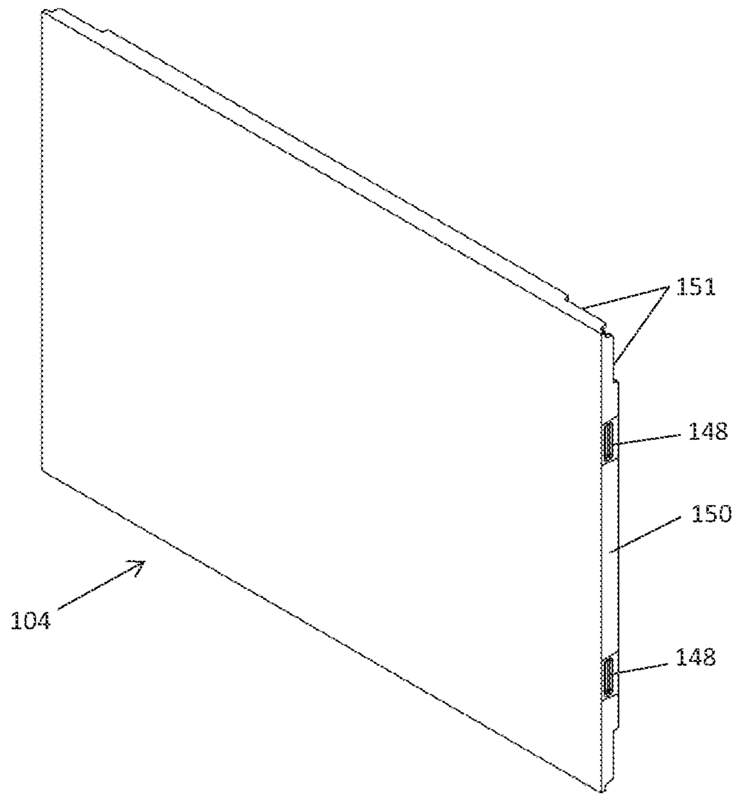
FIG. 4 shows a front perspective view of a cover for engagement over the support in FIG. 2.
Figure 5:
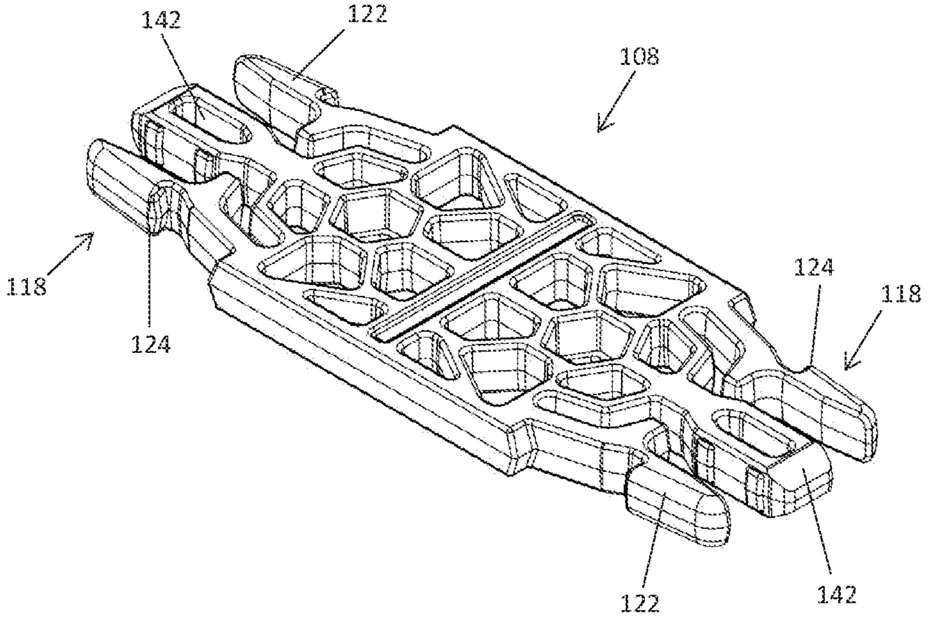
FIG. 5 shows a perspective view of a connector.
Figure 6:
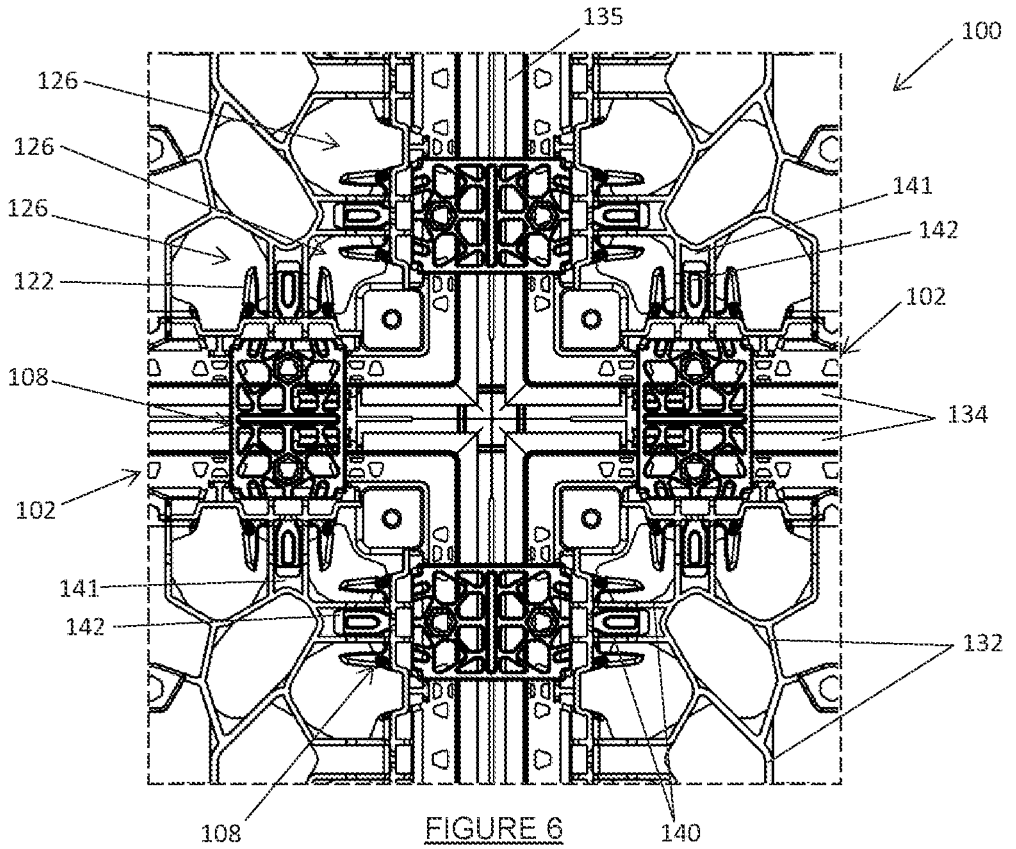
FIG. 6 shows a partial front view of the components assembled, including adjacent corners of four supports and four connectors.
Figure 7:
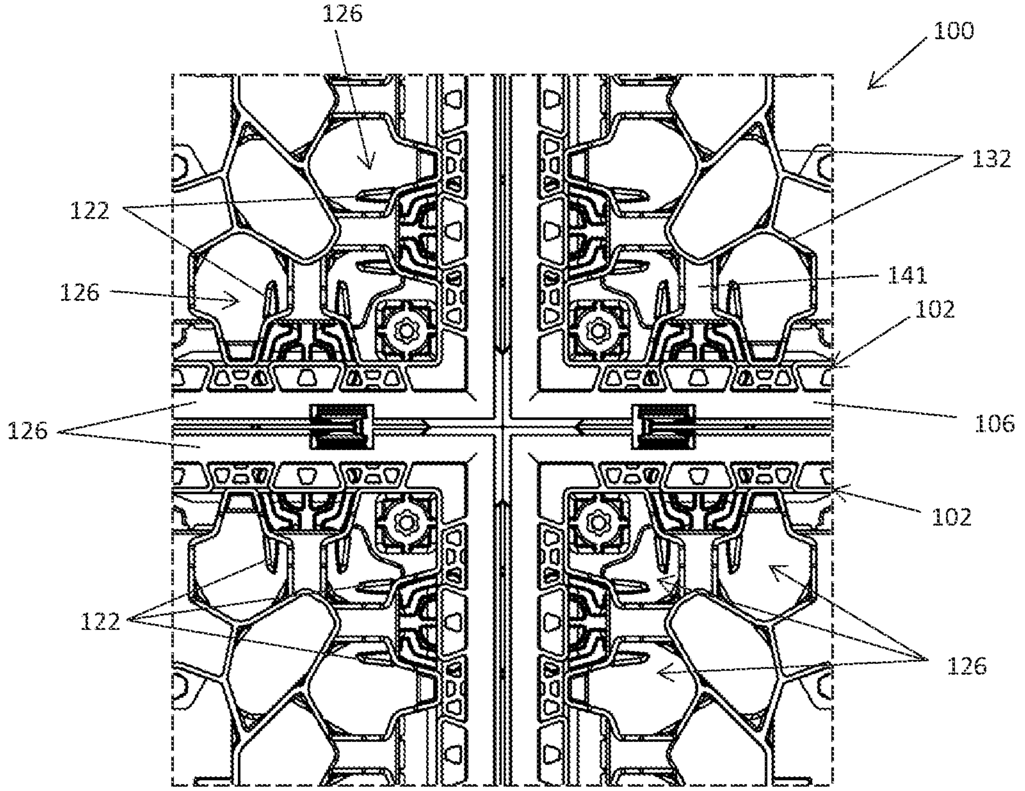
FIG. 7 shows a rear view of the components in FIG. 6.

Referring to the drawings and, in particular, to FIGS. 1 to 7, a graphics display apparatus 100 in accordance with the invention includes the following main components:

- (a) a plurality of rectangular, modular supports 102 (or frame chassis);
- (b) a plurality of planar covers 104 (or cover panels) each respectively releasably engagable over a front side 106 of a support 102; and
- (c) a plurality of connectors 108 for releasably connecting adjacent supports 102.

The supports 102, covers 104 and connectors 108 are moulded from plastics material. The supports and connectors are preferably made from black or opaque plastics material.

The planar covers 104 may be made from different plastics material as will be suited to three different applications of the invention (see FIG. 1):

- i. In a first embodiment, the planar covers are transparent for location over a sheet material 110 depicting a graphic, which sheet of material 110 is located against a support (see top half of FIG. 1);

ii. In a second embodiment, the planar covers will receive on an outer surface 112 thereof an adhesive sheet 114 depicting a graphic in which the cover may be black or opaque plastics material (see bottom half of FIG. 1); and/or iii. In a third embodiment, the planar covers will carry an image printed directly onto the outer surface 112 in which case the cover will be white plastics material.

The supports 102 are securable to each other by fitting a connector 108 into corresponding socket formations 116 of adjacent supports. The connectors 108 are engageable inside the sockets 116 through resiliently deformable locking formations 118. The term "socket" should be widely interpreted and is meant to cover any formation that is configured to receive and engage onto or with a connector or clip.

In this embodiment, the supports 102 have sockets 116 that include a pair of opposed, spaced apart shoulders 120 and the deformable formations 118 are provided on the connector 108 as a pair of prongs 122 with outwardly disposed barbs 124 to engage past the shoulders. The shoulders 120 are laterally disposed in relation to the connectors 108 when these parts are engaged. In accordance with the invention, there is provided an opening 126 through the supports 102 located at each socket 116 of a support to afford access for manual release of the deformable locking formations 118 to disengage a connector 108 from a socket. More specifically, in this embodiment the sockets 116 are provided with an open construction as shown in the drawings, comprising primarily the side flanges 136 and webs 138 referred to below.

The supports 102 include a rectangular frame 128 for edge-to-edge engagement with a frame 128 of an adjacent support 102. The sockets 116 are provided spaced apart along the frames 128 and the connectors 108 have two oppositely disposed symmetrical halves that engage in the sockets 116 to achieve the desired assembly. A network 130 of elements 132 is provided to extend between four members 134 of the rectangular frame 128. The open construction referred to is achieved through the suitable moulded configuration of the elements 132 that extend between frame members 134 to make up the network 130. This provides a light-weight yet sturdy, rigid structure with openings between the network elements 132. The configuration of the support 102 is a product of an injection moulding operation. The features are the result of two suitably configured opposite dies that can be opened with the necessary release angles.

The socket formations have an open construction that includes a pair of spaced apart and relatively short side flanges 136 extending to a rear side of the frame 128, which serve to provide the lateral or side shoulders 120 for engagement by the barbs 124 on the prongs 122. The side flanges 136 of the sockets 116 are connected by a web 138 extending substantially parallel to the frame 128, which serves to retain an inserted connector 108 against the frame. The connectors are in use fitted into or through the sockets and extend inwardly from the frames 128, as shown in the drawings and most clearly in FIGS. 6 and 7. In the current embodiment of the support 102, there are three such sockets 116 provided along a short side and five such sockets 116 along a long side.

The side flanges 136 are connected to an inner side of the frame 128 adjacent a flat portion of a frame member 134 on a back side 135 of the frame, from which the side flanges 136 protrude rearwardly to form the sockets 116. A pair of inner flanges 140 connects the web 138 of the socket 116 to a socket element 141 that extends between the inner flanges 140 and is arranged substantially co-planar with the back side 137 of the frame. The inner flanges 140 and socket element 141 define a channel to receive an elongate guide 142 located between the two prongs 122 of a connector 108. The elements 132 extend inwardly from the frame members 134 and the inner flanges 140 to form the network 130 and the openings 126 to either side of each socket.

With the illustrated socket formations, the assembly needs to take place by joining pre-assembled rows or columns and disassembly involves the removal of rows or columns. The connectors and sockets are either aligned or transversely arranged with each other. The connector can only slide into a socket formation, from a position lateral to a frame. In a variation of the socket construction, the web may be replaced by a pair of oppositely arranged lugs that extend inwardly from the shoulders. The connectors can move into and out of such an alternative socket formation by passing between the lugs when the prongs are pressed inwardly. Such an arrangement would enable the fitment or removal of a single support from an assembly of supports (instead of an entire row or column).

The support 102 includes two resilient clip formations 144 with lips 146 that locate with an interference fit into corresponding slots 148 provided in end flanges 150 of the covers 104. The end flanges 150 have inclined surfaces leading from an edge of the end flanges 150 to the slots 148, which guide the lips 146 into engagement with the slots 148. The covers 104 can be disengaged from the supports 102 by pulling the end flanges 150 away from the clip formations 144. With the covers 104 removed, the prongs 122 on the connectors 108 can be inwardly biased to allow passage of the barbs 124 past the shoulders 120 of the sockets 116 for release of the connectors 108 and disengagement of adjacent supports 102. In an alternative embodiment, the clip formations will be on the cover and the slots will be in the supports.

The corners of the supports 102 have abutting ridge formations 103 which maintain a space between adjacent supports 102 on assembly of the apparatus 100. The end flanges 150 of the covers 104 fit into the space between the supports 102 and have recesses 151 that accommodate the ridge formations 103.

Figures 8, 9:
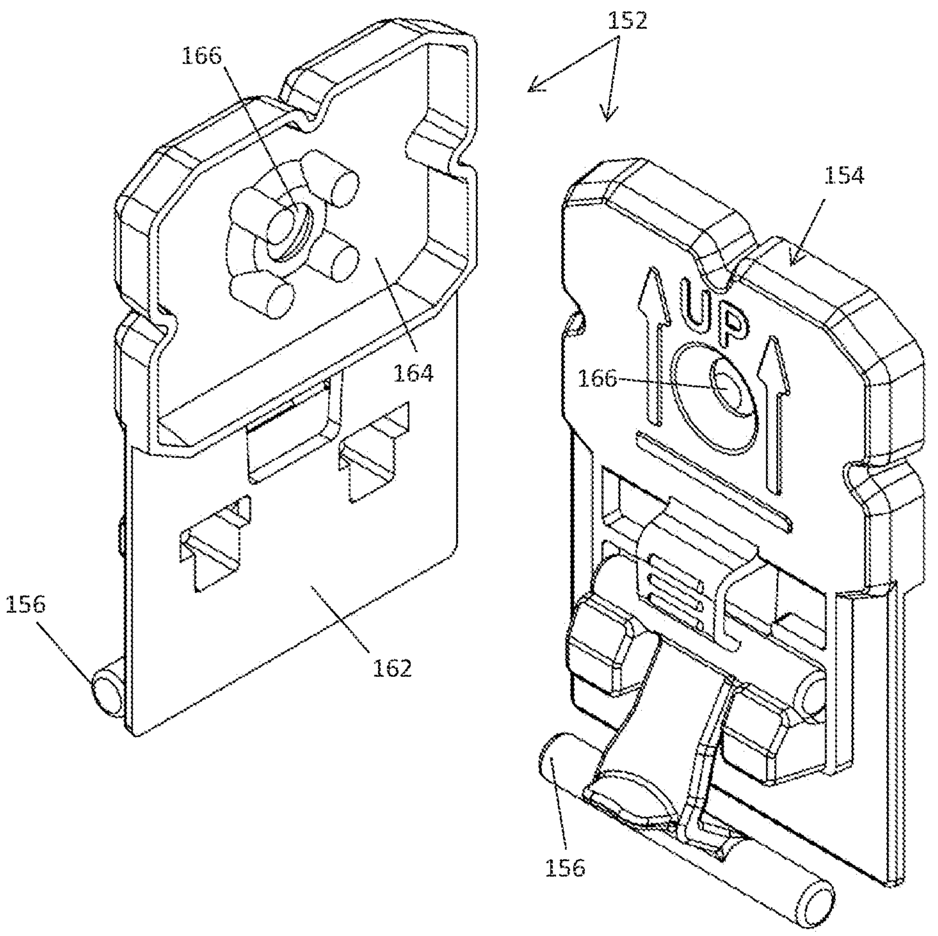
FIG. 8 shows a rear perspective view of a surface mounting bracket.
FIG. 9 shows a front perspective view of the surface mounting bracket in FIG. 8.

With reference to FIGS. 8 and 9, the apparatus 100 further includes surface mounting bracket 152, which primarily comprises a base 154 that is securable to a supporting surface such as a wall, for example. In the current embodiment, a fastener 156 for the mounting bracket 152 is provided as a catch 156 that is pivotably secured to the base 154. A hanging formation 158 is provided centrally on each support 102 with a slot 160 into which the fastener 156 is, in use, locatable to engage the hanging formation 158. In this embodiment, the catch 156 includes a hook and a pair of transverse lugs to engage the hanging formation.

The hanging formation 158 is moulded into the network 130 of elements 132 between the members 134 of the frame 128 and includes four slots arranged to correspond with each of the four frame members, which allow for the four optional hanging positions.

The base 154 of the illustrated embodiment is provided with a flat surface 162 on a region that receives a piece of double-sided adhesive (not shown) and an adjacent chamber 164. The chamber 164 has an open inner side with an edge that will correspond substantially to a sticking surface on the double-sided adhesive when it has been fitted. An opening 166 through a panel on an outer side that allows for application of a liquid adhesive (preferably silicone adhesive) into the interior of the chamber 164 and against an underlying mounting surface to which the double-sided adhesive has already been engaged. The double-sided adhesive allows for easy fastening in position after which a liquid adhesive can be used to full the chamber through the opening to more securely engage the wall.

Depending on the application and sizes of assembled apparatus involved, as well as the nature of the underlying surface onto which the apparatus will be secured, an alternative mounting bracket will have a base provided with a first opening that is suited to receive a nail or a screw that engages in a wall plug or "Rawlplug". A second opening will be provided in a suitably configured formation provided on the base to receive a fastener, which may be a plastic screw or a pin with a head on an outer end and a key profile on an inner end. The second opening co-operates either with a screw thread or has a key-way. In this case, the hanging formation of the support will have a hole through which the fastener is placed (from a front side of the support) to engage into the second opening and secure the support to the base of the mounting bracket. The fastener components of the mounting brackets will be sized to accommodate an even or irregular surface of a wall, which may be the result of a face-brick finish, for example. The support 102 includes several other holes 168 provided in the network 130 which can be used for hanging or to connect to a mounting bracket.

In accordance with a development of the invention there is further disclosed a method for providing an enlarged print of photograph for assembly as part of the display apparatus 100. A customer will choose and supply a photograph to a vendor. The photograph may be submitted through electronic message using a smart phone, for example, or it may be uploaded to an online facility, or it may be copied from a memory stick or data disk to a kiosk. The customer will, in a preferred embodiment, submit the photograph through an online, Internet based facility. However, the service may equally be provided from a pop-up store, photoprint outlet, kiosk or booth in a shopping mall, for example.

The customer selects a required size for printing of the photograph from a range of sizes corresponding to a selected configuration for a display apparatus 100. It will be understood that the photograph will need to be of a suitable resolution for the intended size of printing. The vendor prints the photograph as rectangular portions corresponding to a support 102 of the graphics display apparatus. This may be in accordance of any of the three different applications i, ii or iii referred to above with reference to FIG. 1.

In one embodiment, the cover 104 will be made of white plastics material. As an alternative, a white self-adhesive material can be applied to an opaque cover, assembled as a whole using the support or chassis 102 for spacing and printed directly onto the cover mounted white material. This will serve to achieve the same look as when white plastic covers are printed on directly.

The invention provides that portions of the photograph are preferably printed to omit a border corresponding substantially to a space between graphics on a first support 102 and graphics on an adjacent second support 102. This can be achieved in the software preparation phase or during the print stage if a flatbed direct to media printer is being used. A vendor facility will incorporate suitable software that will partition a photograph and print the relevant portions of the photograph. The relevant portions may be printed with a border for cutting or onto separate sheet or directly onto a white cover, for example. In the case of printing onto an adhesive sheet a peelable backing will be removed before the sheet is adhered to an outer surface of the cover. Self-adhesive decals will be applied on a reverse side of the print using a marker or code that will identify the row and the column that the cover will apply to once the entire graphic has been printed.

The vendor delivers to the customer (through shipping or courier service provider, for example) at a specified address the supports, the portions of the photographs with or on covers 104 together with supports connectors 108 as required for assembly by the customer of the display apparatus 100. The pre-assembled components can be easily packed in compact configuration and will be assembled and hung or otherwise placed when received by the customer. The invention accordingly also relates to a facility that allows a customer to order a large-scale print of a photograph to be assembled on the display apparatus. The supports can be assembled in whatever number to make up a large rectangular display apparatus.

The surface mounting brackets can be secured to a wall, for example, along a straight horizontal line at the required spacing. The display apparatus may also be constructed to provide alternative overall forms. An arch may, for example, be constructed around an entrance, doorframe or a kiosk counter.

Figure 10:
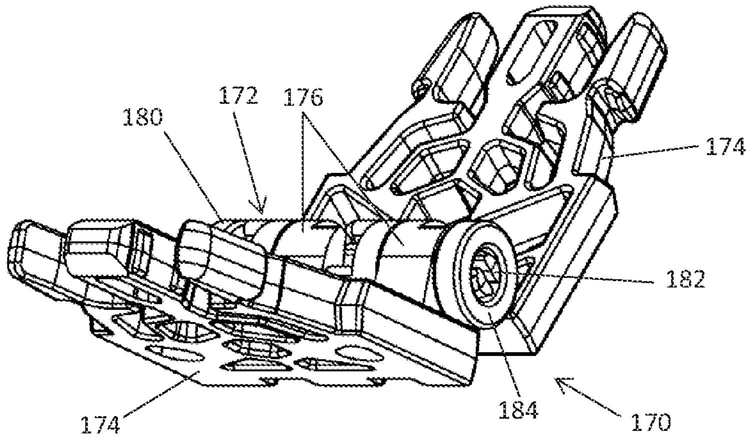
FIG. 10 shows a perspective view of a hinged connector.
Figure 11:
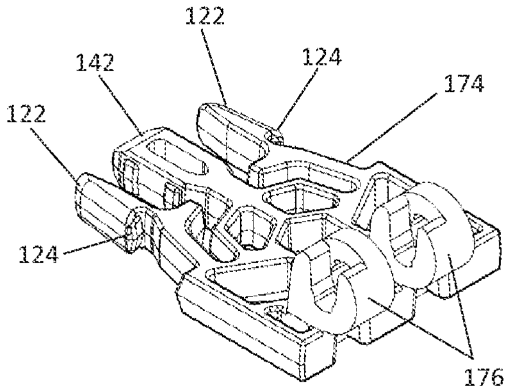
FIG. 11 shows a perspective view of a connector component for an outer frame assembly.
Figure 12:
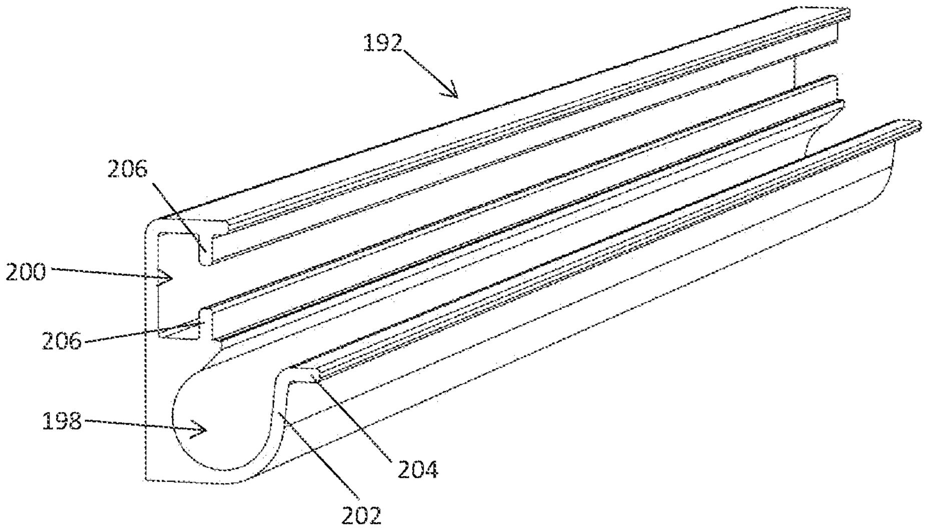
FIG. 12 shows a perspective view of an extruded rail for an outer frame assembly.
Figure 13:
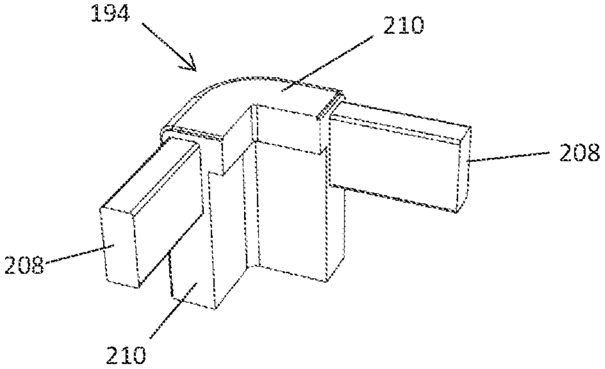
FIG. 13 shows a perspective view of a corner piece.
Figure 14:
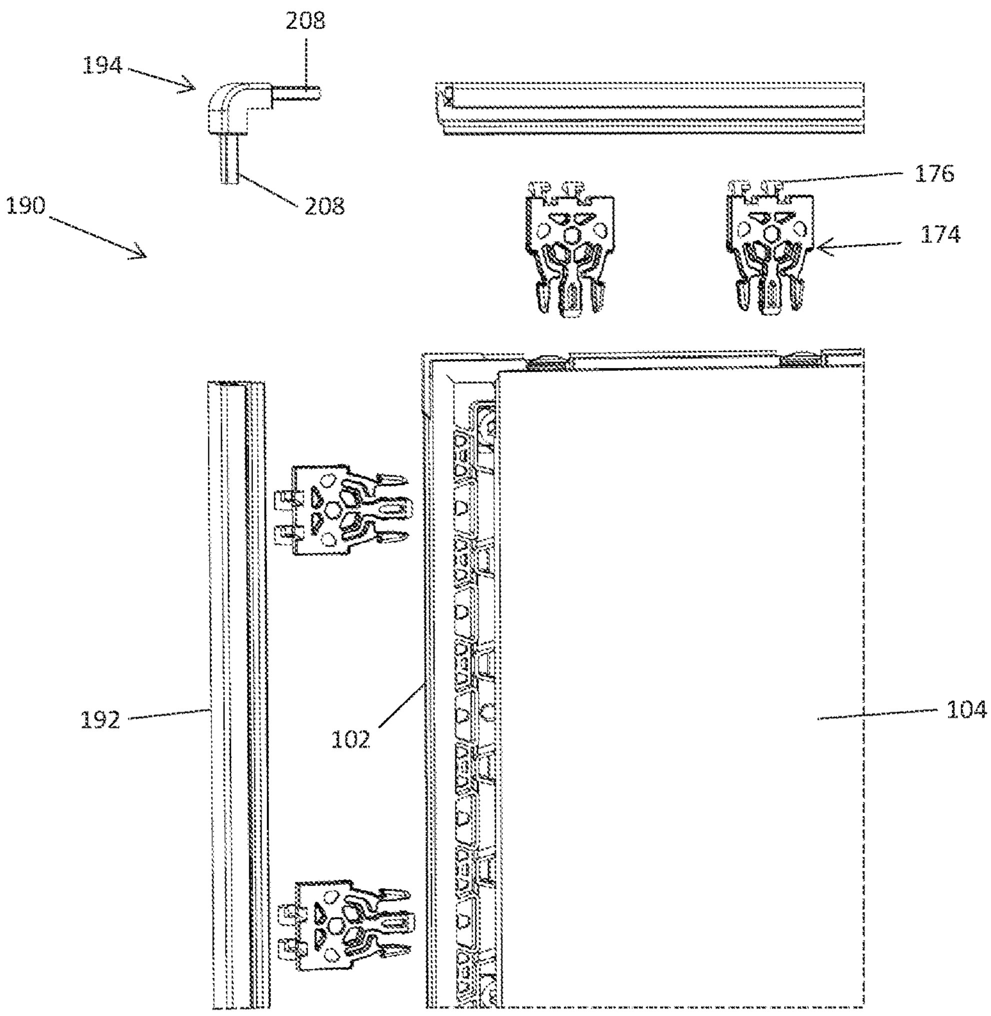
FIG. 14 shows an exploded view of the frame assembly and a corner of the apparatus.
Figure 15:
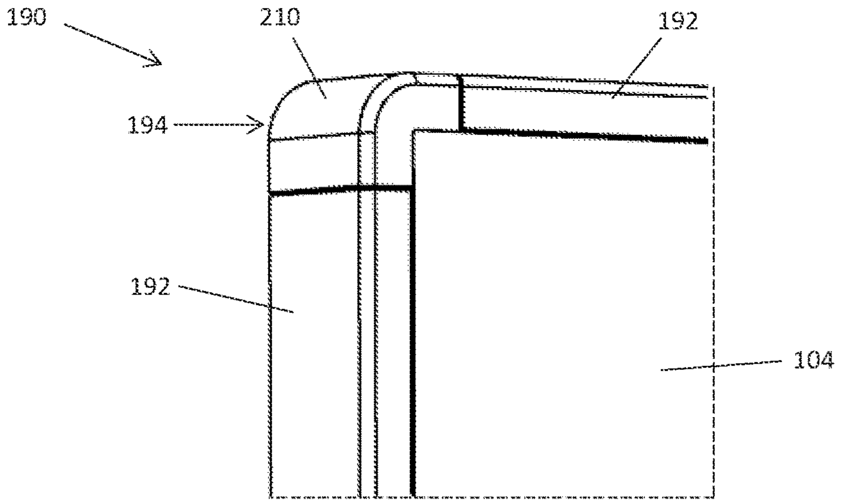
FIG. 15 shows a perspective view of the frame assembled onto the corner of the apparatus.
Figure 16:
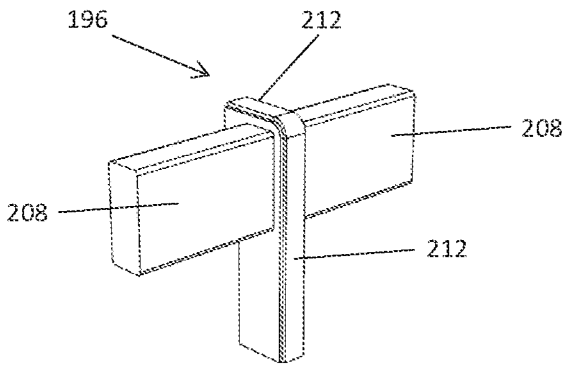
FIG. 16 shows a perspective view of a rail joint.
Figure 17:
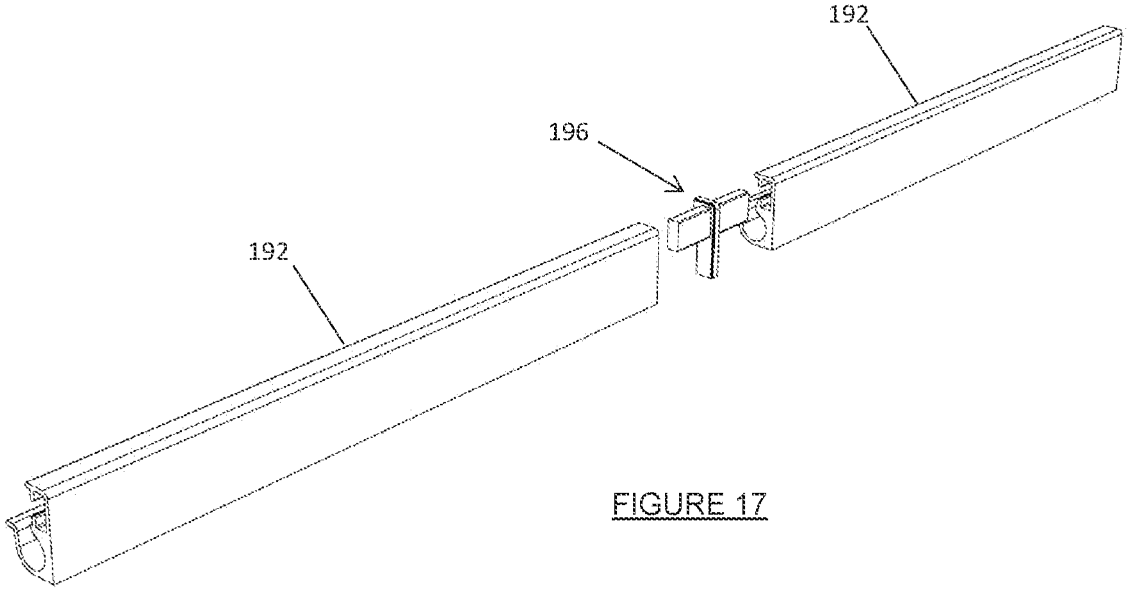
FIG. 17 shows a pairs of rails to either side of the rail joint.

FIG. 10 shows an alternative connector configuration 170 that provides for a three-dimensional arrangement of a multi-sided display apparatus. A hinge 172 is located along a line between adjacent supports. Two of the same connector components 174 are moulded with integral hinge knuckles 176, as shown in FIG. 11. The two components 174 are connected by a hinge pin 178 with a head on one end 180 and a split enlarged formation 182 on the other end that has a locking fit into a washer 184. One example of the configuration of display apparatus that the hinge connector 170 enables is a triangular or three-sided pillar that may be constructed from six or more supports. The height and number of adjacent supports can be increased. The latter will change the shape to a four, five, or six-sided pillar and so on. The hinged connectors allow the construction of corners at a variety of angles. In a further alternative, the supports 102 can be secured back-to-back. This may be achieved using the holes 168 at the corners of the supports 102 and the hinge connectors 170 around the edges of the apparatus 100. The back-to-back configuration enables a double sided panel or wall to be constructed, which could be used to construct a cubicle for example.

The connector components 174 as shown in FIG. 11 are also provided for use with a modular outer frame assembly 190, which includes extruded rails 192, corner pieces 194, and rail joints 196. These parts are described with reference to FIGS. 12 to 17.

Once the apparatus 100 has been assembled from a plurality of supports 102, the connector components 174 are fitted into the sockets 116 about the periphery of the apparatus 100 in the same manner as the connectors 108. The hinge knuckles 176 protrude to a rearward side along the edge of each support 102.

The rails 192 are provided with a mounting groove 198 and a coupling channel 200. The mounting groove 198 has a rounded profile formed under a curved flange 202. An angled tongue 204 extends along a free edge of the curved flange 202. The plastic material of the rail 192 provides that the curved flange 202 is resiliently deformable. The knuckles 176 provide corresponding mounting formations 176 for engagement into the mounting groove 198. The tongue 204 provides an opening formation to assist fitting of the groove 198 onto the knuckles 176 of the connector components 174. The knuckles 176 and groove 198 accordingly provide co-operating engaging formations 176 and 198.

The coupling channel 200 is provided with a pair of opposed lips 206. The corner pieces 194 and rail joints 196 each have a pair of rectangular profile

The invention claimed is:

1. A graphics display apparatus comprising:

(a) a plurality of rectangular modular supports;

(b) a plurality of planar covers each releasably engageable over a front side of a support; and (c) a plurality of connectors for releasably connecting adjacent supports;

wherein:

the supports each have a rectangular frame for edge-to-edge engagement with a frame of an adjacent support and sockets for the connectors that are provided along the frames;

the supports are securable to each other by fitting a connector into corresponding sockets of adjacent supports;

the connectors are engageable inside the sockets through resiliently deformable locking formations;

edges of the frames are provided with abutting ridge formations that maintain spaces between adjacent supports and the covers are provided with end flanges that fit into the spaces; and at least one opening is provided through the front side of the supports located at each of the sockets to afford access on removal of the covers for manual release of the deformable locking formations to disengage the connectors from the sockets.

2. The apparatus as claimed in claim 1, wherein a network of elements extends between four members of the rectangular frame of each of the supports.

3. The apparatus as claimed in claim 1, wherein the planar covers are transparent for location over a sheet material depicting a graphic, which sheet of material is located against each of the supports.

4. The apparatus as claimed in claim 1, wherein the planar covers receive on an outer surface thereof an adhesive sheet depicting a graphic.

5. The apparatus as claimed in claim 1, wherein the planar covers carry an image printed directly thereon.

6. The apparatus as claimed in claim 2, wherein the supports have sockets that include a pair of opposed, spaced apart shoulders and the deformable formations are provided on the clips as a pair of prongs with outwardly disposed barbs to engage past the shoulders.

7. The apparatus as claimed in claim 6, wherein the sockets are each provided by a pair of spaced apart side flanges extending rearwardly from the frame.

8. The apparatus as claimed in claim 7, wherein the sockets are each provided by a pair of spaced apart side flanges that are connected by a web extending substantially parallel to the frame.

9. The apparatus as claimed in claim 7, wherein the flanges are connected to a socket element extending to form part of the network of elements with a pair of inner flanges connecting the web to the socket element and defining with the socket element a slot to receive an elongate guide located between the two prongs of a connector.

10. The apparatus as claimed in claim 1, wherein the supports and end flanges of the covers include resilient clip formations with lips that locate with an interference fit into slots.

11. The apparatus as claimed in claim 1, wherein the apparatus includes surface mounting bracket comprising a base and a fastener that is securable to the base and locatable in a hanging formation provided in the network of elements on the support.

12. The apparatus as claimed in claim 11, wherein the hanging formation is located substantially centrally between the members of the frame.

13. The apparatus as claimed in claim 1, further comprising an outer frame assembly that includes rails, corner pieces, and rail joints with connector components securable into sockets about a periphery of an assembled apparatus and co-operating engaging formations provided between the connector components and the rails.

14. The apparatus as claimed in claim 13, wherein the rails are provided with a mounting groove and a coupling channel, the mounting groove engageable with corresponding mounting formations on the connector components and the coupling channel engageable with spigots on the corner pieces and rail joints.

15. The apparatus as claimed in claim 14, wherein the mounting groove has a rounded profile formed under a resiliently deformable curved flange and the coupling channel is provided with a pair of opposed lips and provides a friction fit onto rectangular profile spigots of the corner pieces and rail joints.

16. The apparatus as claimed in claim 15, wherein the corner pieces and rail joints respectively include corner spacers and border spacers that fit flush with a profile of the rails when assembled.

17. A method for providing an enlarged photograph for display in a graphics display apparatus according to claim 1, which includes:

supplying a photograph for printing;

specifying a required size for printing of the photograph, wherein the size is selected from a range of sizes for the graphics display apparatus;

printing the photograph as rectangular portions corresponding to a support of the graphics display apparatus; and providing the supports, the portions of the photographs and/or covers, and the connectors for assembly of the graphics display apparatus according to any one of the preceding claims.

18. The method as claimed in claim 17, wherein the portions of the photograph to be printed omit a border corresponding substantially to a space between graphics on a first support and graphics on an adjacent second support.

19. The method as claimed in claim 17, wherein the portions of the photograph each carry a mark corresponding to its position in a row and/or column of the photograph.

20. The method as claimed in claim 17, wherein the photograph is supplied through an online, Internet based facility and the display apparatus is delivered to an address provided through the facility.

* * * * *